United States Patent [19]
Åkerberg

[11] Patent Number: 5,134,710
[45] Date of Patent: Jul. 28, 1992

[54] METHOD OF TRANSMITTING CALL INFORMATION IN A SHORT RANGE MOBILE TELEPHONE SYSTEM AND A RADIO UNIT FOR CARRYING OUT THE METHOD

[75] Inventor: Dag E. Åkerberg, Järfälla, Sweden

[73] Assignee: Telefonaktiebolaget L M Ericsson, Stockholm, Sweden

[21] Appl. No.: 363,125

[22] Filed: Jun. 8, 1989

[30] Foreign Application Priority Data

Oct. 17, 1988 [SE] Sweden .................... 8803696

[51] Int. Cl.$^5$ ................... H04B 1/00; H04J 3/16
[52] U.S. Cl. .................. 455/54.1; 379/63; 370/95.3
[58] Field of Search ............ 455/33, 34, 54; 379/59, 379/60, 63; 370/95.1, 95.3, 110.1, 69.1

[56] References Cited

U.S. PATENT DOCUMENTS

| | | | |
|---|---|---|---|
| 4,747,101 | 5/1988 | Akaiwa et al. | 370/95.1 |
| 4,748,681 | 5/1988 | Schmidt | 370/95.1 |
| 4,754,453 | 6/1988 | Eizenhoffer | 455/33 |
| 4,914,651 | 4/1990 | Lusignan | 455/33 |

Primary Examiner—Curtis Kuntz
Attorney, Agent, or Firm—Burns, Doane, Swecker & Mathis

[57] ABSTRACT

A method of transmitting calls between a radio base station (FS) and one or more portable radio telephones (PS) which are at a short distance from the base station. The base stations of the mobile radio system all have access to all carrier frequencies ($f_1$-$f_4$) and transmit/receive call information with the aid of time division multiple access (TDMA). The transmission from a base station (FS) to a radio telephone (PS) occupies time slots (CH1-CH16) within one half of a frame interval and the reception occupies time slots within the other half. When a channel occupies a time slot (CH1) for transmission/reception over a given carrier frequency ($f_1$) the remaining carrier frequencies are blocked for precisely this time slot, and a second time slot with the same ($f_1$) or a second carrier frequency ($f_1$-$f_4$) shall be used for a second channel. A radio unit for carrying out the method is described.

4 Claims, 3 Drawing Sheets

METHOD OF TRANSMITTING CALL INFORMATION IN A SHORT RANGE MOBILE TELEPHONE SYSTEM AND A RADIO UNIT FOR CARRYING OUT THE METHOD

TECHNICAL FIELD

The present invention relates to a method in accordance with the preamble to claim 1 and is particularly intended for use in a cordless mobile telephone system with portable handsets within an office building or a housing block, with short range (about 50–100 m) between the stationary radio unit and the portable handsets. The invention also relates to a radio unit for carrying out the method.

BACKGROUND ART

An installation with portable, cordless telephone sets which utilizes time division multiple access (TDMA) is already described in such as the Swedish patent 85.02319-0. In this known installation there is a plurality of stationary radio units connected to a radio exchange via a wire connection. One or more telephone handsets are in radio communication with each of the radio units, and between the radio units the portable handsets are usable within a short distance from a radio unit.

In installations or systems with TDMA, a base station can have several calls in progress simultaneously, by utilizing several time slots on a single radio frequency within a frame, as is described in the above mentioned patent specification. In the application of cordless office telephony it has been proposed by different manufacturers to have a total of 32 different time slots in a frame, 16 slots being reserved for the transmission direction of the radio unit handset and 16 slots for the reception direction of the handset radio unit, see the accompanying FIG. 1. If only one radio frequency is used, a so-called combiner is avoided, i.e. a unit which, when several radio frequencies are used, multiplexes the time slots associated with each of the radio frequencies.

However, it is not always practicable to allot a single TDMA frame to all call channels which have been assigned a base station. The bit rate and top power is namely proportional to the number of time slots, i.e. the greater the number of slots allotted to a frame, the higher the top power which must be selected from a transmitter in the base station and in the mobile handset. In systems with many channels, and thus many time slots, TDMA is normally used with several carrier frequencies. The accompanying FIG. 2 is a diagram showing the distribution of four carrier frequencies $f_1$–$f_4$. Each frequency is assigned a given bandwidth B1–B4 and each is alloted a TDMA frame with N time slots. This distribution is still cost-saving, since the total number of radio frequencies (and thereby the number of transmitter/receivers) is N times less than in traditional systems using a carrier frequency-channel FDMA. However, a combiner is required once again.

Mobile telephone systems in use at present use a fixed channel allotment, i.e. each base station has access to an array of specified frequency channels, which can all be utilized simultaneously if so required. The allotted frequencies can be used without risk of interference (noise) since the same array of channels is only allotted to base stations with sufficiently separated geographical positions.

A channel allocation used more recently is the so-called dynamic channel allocation, as described in the above mentioned patent, for example. According to this, all base stations in the system have access to all channels, where each channel has one, or is assigned a given radio frequency and a given time slot. When a call is to be connected, the channel is selected which is unoccupied at the moment and which is least affected by noise. This results in that greater traffic reckoned in MHz bandwidth can be offered than is the case with fixed channel allocation. The system thus adapts itself to local traffic top load variation and to possible shadow effect variations. In contradistinction to fixed channel allocation, dynamic channel allocation results in that each base never uses (or is intended to use) all allotted channels simultaneously.

DISCLOSURE OF THE INVENTION

The invention is founded on the observation that not all channels are simultaneously utilized in a base station, i.e. there are always one or more time slots unoccupied for a given radio frequency, and in certain cases, all time slots for a given frequency or all frequencies for a given time slot can be available for calls. The object of the present invention is to utilize the above mentioned fact by reducing the number of radio units in a base station which generate radio frequencies and thereby avoid the use of a so-called combiner, which makes the base station more complicated and expensive.

BRIEF DESCRIPTION OF THE DRAWINGS

The invention will now be described in more detail and with reference to the accompanying drawings, where.

BEST MODES FOR CARRYING OUT THE INVENTION

Figure 1:
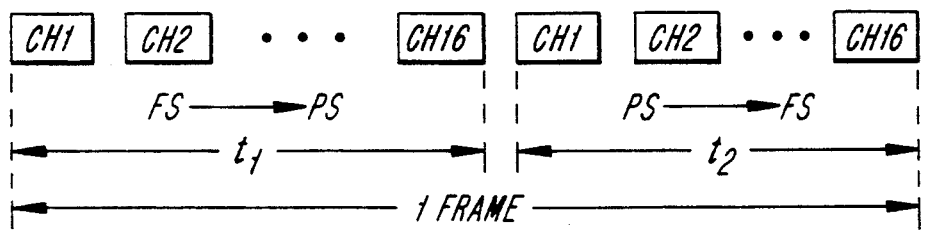
FIG. 1 is a diagram of a frame with associated time slots in a mobile telephone system.

FIG. 1 illustrates a frame with a total of 32 time slots, of which 16 (CH1–CH16) are used in the direction-fixed station FS to portable station PS (the transmission direction) and 16 time slots CH1–CH16 are used in the direction portable station PS to fixed station FS (the reception direction). All time slots are transmitted over a given carrier frequency.

Figure 2:
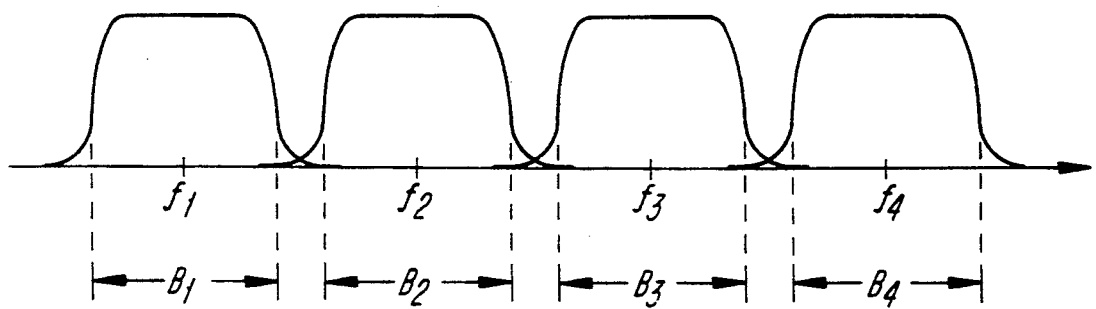
FIG. 2 is a frequency diagram.

FIG. 2 is a frequency diagram with four different carrier frequencies $f_1$–$f_4$ utilized by the system. The distance between two adjacent frequencies, e.g. between $f_1$ and $f_2$ can be about 2 MHz and the bandwidth B1–B4 at the disposition of each of the frequencies $f_1$–$f_4$ will thus be 2 MHz. However, as will be seen from the diagram, the band B1 will come partly inside the band B2 for the frequency $f_2$, i.e. adjacent bands interfere with each other. If TDMA is utilized according to FIG.

1, this means that the same time slot cannot generally be utilized by an adjacent carrier frequency. For example, the time slot CH1, utilizing the carrier frequency $f_1$, cannot be utilized by the carrier frequency $f_2$ if the base station is simultaneously to serve two portable handsets for this time slot CH1 (but with different carrier frequencies $f_1$, $f_2$). If a portable handset is very close to the base station, the same time slot can definitely not be used by another handset associated with this base station. It is therefore improbable that the traffic capacity will be noticeably restricted if a reserved time slot (CH1) for a given carrier frequency ($f_1$) cannot be utilized by the remaining carrier frequencies in the system.

Figure 3:
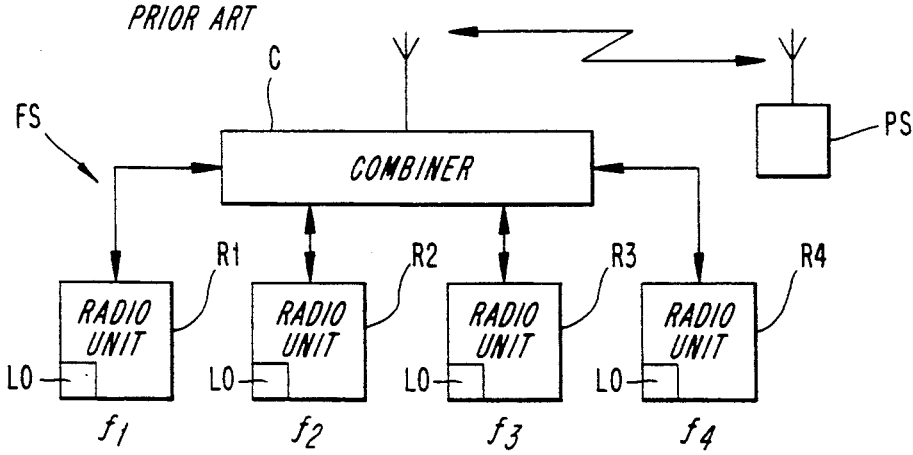
FIG. 3 is a schematic block diagram of a base station of known embodiment with several transmitters/receivers, and in association herewith

FIG. 3 is a simple block diagram of a known radio base station with four radio units R1-R4 and a so-called combiner C. Each of the units R1-R4 transmits and receives on a given carrier frequency $f_1$, $f_2$, $f_3$ or $f_4$ and in principle can utilize all time slots CH1-CH16 for transmission to, and CH1-CH16 reception from a portable handset PS. Each radio unit has a local oscillator LO generating the carrier frequency associated with the particular unit.

Figure 4:
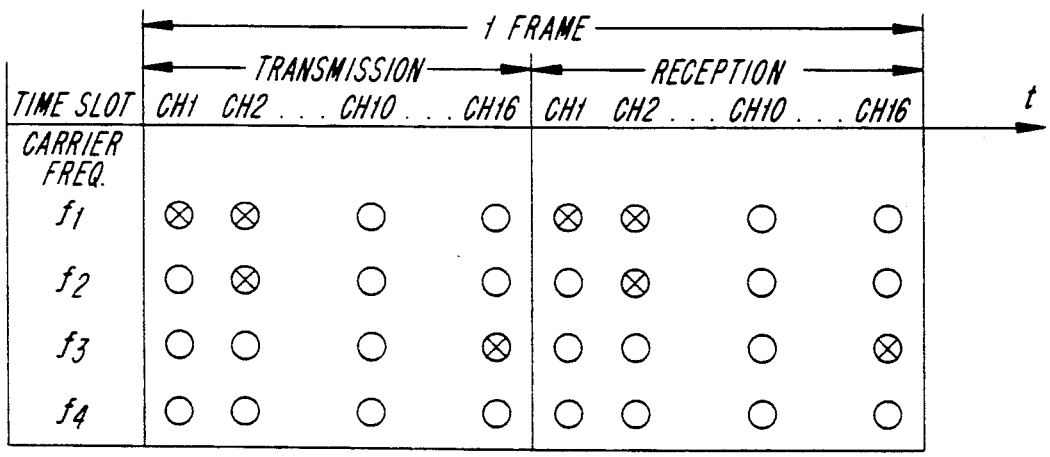
FIG. 4 is a chart over a given channel allocation with carrier frequencies and time slots.

FIG. 4 is a chart of the channel distribution, where a given channel consists of a given carrier frequency and a given time slot (denoted by a ring on the chart) The occupied channels are denoted by a cross in a ring. For example, an occupation state is illustrated in FIG. 4 where the channels ($f_1$, CH1), ($f_1$, CH2), ($f_3$, CH16) are occupied in the transmission direction FS to PS and corresponding channels are occupied in the reception direction PS to FS. It should be noted that (according to FIG. 1) the time slots CH1-CH16 in the transmission direction are separated in time from the corresponding time slots CH1-CH16 in the reception direction by half a frame distance. The channel selection in the system is adaptive, i.e. each radio unit FS can freely utilize one or more of all channels in the system.

In accordance with the proposed method, only one carrier frequency is reserved for a given time slot, while remaining frequencies for this time slot are not to be used. In the chart according to FIG. 5, the channel formed by the carrier frequency $f_1$ and the time slot CH1 is occupied, for example. As with the chart according to FIG. 4, the frame interval is divided into two halves; a transmitting frame half and a receiving frame half (transmission FS to PS and reception PS to FS). Remaining carrier frequencies $f_2$, $f_3$ and $f_4$ for the time slot CH1 are not to be used for transmission, and not for reception during the receiving frame half. This has been denoted by a dash in FIG. 5. In the same way, the carrier frequencies $f_1$, $f_2$ and $f_4$ are blocked for the time slot CH16, since it is assumed that the channel with the carrier frequency $f_3$, and time slot CH16 is occupied in the transmitting frame half, and the same thing applies to the receiving frame half. In the chart according to FIG. 5 it is assumed, for the sake of simplicity, that the remaining time slots are unoccupied for a given carrier frequency. All time slots CH1-CH16 for both frame halves shall have the same array of carrier frequencies available, but two time slots can utilize the same carrier frequency, e.g. CH1 and CH10 can both utilize $f_1$.

Figure 5:
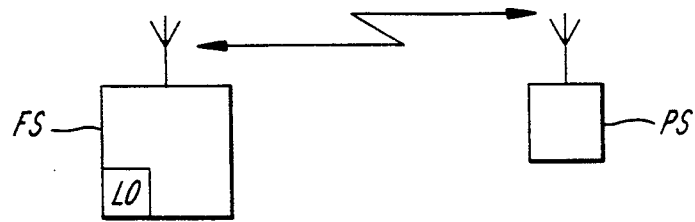
FIG. 5 is a block diagram of a base station utilizing the method in accordance with the invention and in association herewith

Each base station in the system has access to the 64 different channels, but each base station can only utilize 16 of these simultaneously For channel allocation in the known system according to FIG. 4 and for channel allocation according to FIG. 5, all 64 channels can be utilized. But in the known channel distribution according to FIG. 3, each base station can freely select between these 64 channels. The method in accordance with the invention somewhat restricts the selection of new channels as described in connection with FIG. 5. In a practical simulation of a system with the above-mentioned properties, it has been found, however, that the number of blocked and interrupted calls will only be insignificantly greater if the proposed method is used.

Figure 6:
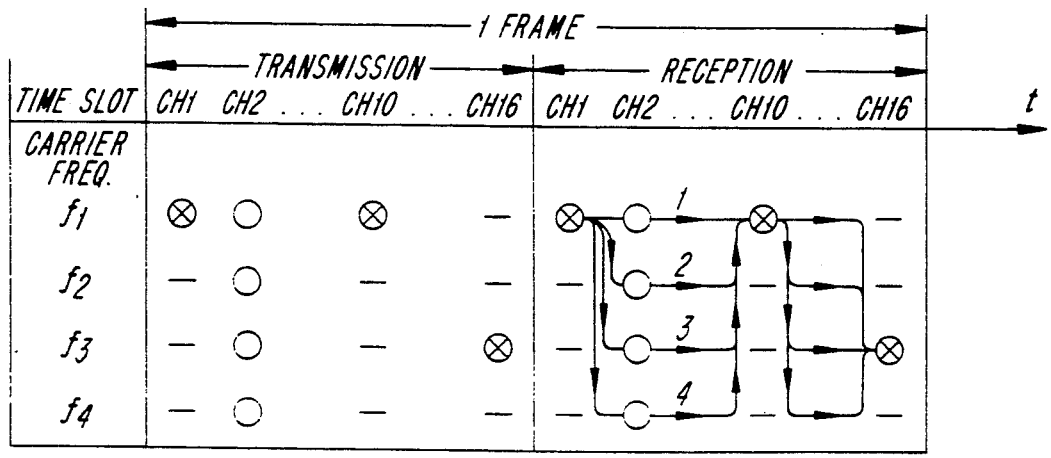
FIG. 6 is a chart of a given channel allocation in accordance with the method with carrier frequencies and time slots.

The above-described method of allocating carrier frequencies and time slots results in that the number of simultaneously usable channels per base will be restricted to N (= to the number of time slots in each transmission and reception direction). The advantage is that several radio units (R1-R4 in FIG. 3) are avoided in the base station. With the proposed method, the base station comprises a single radio unit RA according to FIG. 6. The only thing which causes this unit to differ from each of the units R1-R4 in FIG. 3 is the implementation of the local oscillator LO. In the known base station according to FIG. 3, the local oscillators LO are each set to a given fixed frequency $f_1$-$f_4$. In the radio unit RA the local oscillator LO is implemented such that it can jump between the different carrier frequencies $f_1$-$f_4$. The block diagram according to FIG. 7 more closely illustrates the construction of the radio unit RA according to FIG. 6. This consists of a modification of a radio unit illustrated in the above-mentioned Swedish patent.

Figure 7:
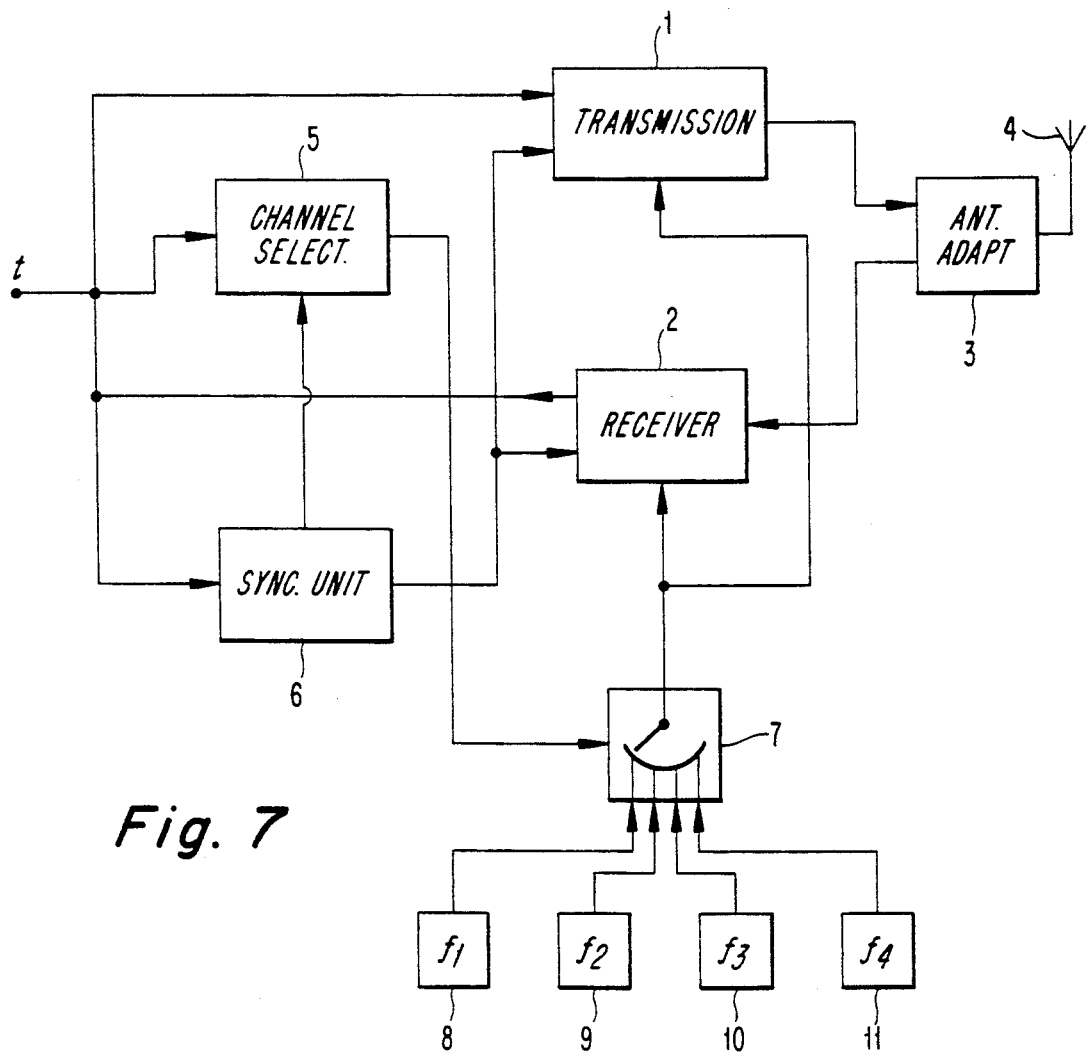
FIG. 7 is a detailed block diagram of the radio unit according to FIG. 5.

The radio unit according to FIG. 7 contains a transmitter 1, receiver 2, and an antenna adaption unit 3 for an antenna 4. The transmitter 1 has a first input connected to the input terminal t of the unit, and the receiver 2 has its output connected to this terminal. The terminal t is connected to a radio exchange. This is possible, since the transmitter 1 and receiver 2 are activated alternatingly, i.e. the transmitter 1 receives the information signals which are to be transmitted during one half of the frame interval, while the receiver 2 sends received radio signals to the radio exchange during the other half of a frame interval (see FIG. 1). Transmitter and receiver parts 1 and 2 are known embodiment and contain a modulator and a demodulator for modulating the information signals coming from the radio exchange to outgoing radio signals, and demodulating incoming radio signals from the antenna 4, respectively.

A synchronizing unit 6 is conventionally connected between the terminal t of the radio unit and to both units 1 and 2 for controlling the connection times (see above) of the transmitter 1 and the receiver 2, as well as for synchronizing the included modulator/demodulator. A channel selector 5 is further connected to the radio exchange via the terminal t for selecting an unoccupied channel when transmitting and receiving.

As has already been described, only one carrier frequency, (e.g. $f_1$, FIG. 5) may be utilized during each time slot (CH1). The radio unit according to FIG. 7 therefore contains a plurality of local oscillators 8-11, each of which generates a carrier frequency $f_1$-$f_4$. The output of each of the oscillators 8-11 is connected to a switch 7 which is controllable from the channel selector 5. The output of the switch 7 is connected to the local oscillator input of each radio unit 1 and receiver 2. In this case, the switch 7 has four different positions for switching-in each of the local oscillators 8-11 to the transmitter 1 and receiver 2 in response to the control signals from the channel selector 5. Since the transmitter 1 and receiver 2 operate alternatingly during the transmission half and the reception half of the frame interval, both these local oscillator inputs can be connected to the output of the switch 7.

Transmission to PS from the radio unit FS.

There are memory means in the channel selector 5 for the transmitter 1 to store the value of the carrier frequencies $f_1$-$f_4$ for the different time slots CH1–CH16 during the transmission half of the frame interval. At the beginning of the transmission (which is initiated by the radio exchange) a certain carrier frequency $f_1$ is selected, and this is to be used during the time slot CH1 in the case where $f_1$ is not occupied. Should $f_1$ be occupied, the next time slot CH2 is awaited, etc. Simultaneously the frequency $f_1$ is reserved for the time slot CH1 during the reception half of the frame interval. Remaining carrier frequencies $f_1$-$f_4$ are blocked for the time slot CH1. A control signal is sent to the switch 7, which then switches-in the local oscillator 8 so that the carrier frequency $f_1$ is sent to the transmitter during the transmission time (frame half 1) and to the receiver during the reception time (frame half 2). At the beginning of the next time slot CH2, the same procedure takes place if the transmission is to go to another portable handset PS.

Reception from a PS to FS.

For the receiver 2 there are memory means and logic in the channel selector 5 which scan the different time slots CH1–CH16 for each carrier frequency $f_1$-$f_4$ with respect to whether a call is in progress or not. The number of scans of CH1–CH16 is equal to the number of carrier frequencies. In the present case four scans are thus carried out, each during a time corresponding to the reception time of the frame interval. The memory means in the channel selector then stores the channels which are occupied so that detection of the content in the occupied time slots is carried out by the receiver 2. If it is assumed that three channels are occupied with calls according to FIG. 5, the following scan during each frame interval for reception is obtained:

Scan 1: For the carrier frequency $f_1$, time slots CH1–CH16. A jump takes place to the carrier frequency $f_3$ for the time slot CH16. The control signal is transmitted to the switch 7 during the time slots CH1, CH10 for connecting the local oscillator 8($f_1$) and during the time slot CH16 for connecting the local oscillator 10($f_3$).

Scan 2: For the carrier frequency $f_2$, jump to carrier frequency $f_1$ for CH1. Scan of the time slot CH1–CH9. Jump to frequency $f_1$ for CH10. Scan of time slots CH11–CH15. Jump to carrier frequency $f_3$ for CH16. Control signals to switch 7 for switching-in the local oscillator 8 during the time slots CH1, CH10 and the local oscillator 10 during the time slot CH16.

During scans 3 and 4 jumps take place in the same way to the carrier frequency $f_1$ for CH1, CH10 and in scan 4 a jump to the carrier frequency $f_3$ and corresponding local oscillator 8 and 10, respectively.

The above applies for calls in progress between an FS and a PS. In the portable handset PS there are corresponding units as in FS, i.e. channel selector and synchronizing unit. The method can of course be utilized for ringing up, if a given ringing-up channel common to the entire installation is reserved.

In the embodiment according to FIG. 7, the carrier frequencies $f_1$-$f_4$ are generated by four separate oscillators 8–11 connected to a switch 7. It is of course possible to have a single oscillator means which can be controlled so that it sends the desired carrier frequencies, or to have different oscillators for transmitter and receiver.

It is also possible to let the transmitter be modulated directly from a local oscillator means which is connected to the input terminal t. The output signal (controlling signal) from the channel selector 5 makes a rough setting to the correct carrier frequency, subsequent to which modulation with the information signal from the terminal t takes place. The local oscillator means can be a VCO which can also be conventionlly controlled with the aid of frequency synthesis for generating desired local oscillator frequencies.

I claim:

1. Method for transmitting ringing-up and call information over radio channels which are dynamically allocated in a mobile telephone system with short range between a base station and a mobile telephone using time division multiple access (TDMA), the base station using a given number of carrier frequencies ($f_1$-$f_4$) common to the whole system and a plurality of time slots (CH1–CH16) allocated to each carrier frequency, transmission and reception of calls taking place over one of said carrier frequencies and during separate time slots within a frame, characterized in that for transmission over a first channel, a first carrier frequency ($f_1$) and a first time slot (CH1) are utilized, while transmission of the remaining carrier frequencies ($f_2$-$f_4$) are blocked during this time slot, and for reception over a second channel a second time slot is utilized, said second time slot is shifted a half frame interval in relation to the first time slot, while remaining carrier frequencies for this time slot are blocked.

2. A radio unit included in a base station (FS) in a mobile telephone system working according to the (TDMA) principle for transmitting and receiving radio calls between the base station (FS) and at least one mobile telephone (PS) at a short distance from the base station over a plurality of carrier frequencies ($f_1$-$f_4$) common to the entire system, the radio unit including:

(a) a transmitter unit (1) for transmitting call information to the mobile telephone over a given carrier frequency (f1) and a given time slot (CH1) during the transmission time within a frame interval, (b) a receiver unit (2) for receiving call information from a mobile telephone (PS) in a corresponding time slot during the reception time in a frame interval and over a given carrier frequency (f1), (c) an antenna unit (4) together with antenna adaption means (3) connected to transmitter unit 1 and receiver unit 2, (d) channel selector (5) together with synchronizing unit (6) for selecting an unoccupied channel among the time slots (CH1–CH16) which is available during said transmission time and reception time of a frame interval, characterized in that the channel selector (5) is adapted such that during said transmission time and for a given selected time slot (CH1) and carrier frequency (f1) remaining carrier frequencies ($f_2$-$f_4$) are blocked for calls in this time slot (CH1), and in that during said reception interval the occupation state is scanned with relation to occupied time slots (CH1, CH10, CH16) for each of the carrier frequencies, the carrier frequencies (f1, f2, f3), the corresponding time slots of which are occupied, being stored and a control signal generated which points out during the transmission interval the selected carrier frequency for the selected time slot, and during the reception interval points out the carrier frequency or frequencies for the occupied time slots, and in that a controllable local oscillator means (7, 8-11) is arranged for generating one of said number of carrier frequencies ($f_1$-$f_4$) in response to said control signal from the channel selector (5) and for transmitting said carrier frequency to the transmitter (1) during its associated time slot in said transmission interval and to the receiver (2) during said transmission interval.

3. A radio unit as claimed in claim 2, characterized in that the controllable local oscillator means comprises a plurality of separate local oscillators (8-11) corresponding to the number of carrier frequencies ($f_1$-$f_4$) in the system, and a controllable switch (7), this switch (7) connecting one (8) of the local oscillators to the local oscillator input of the transmitter unit (1) and receiver unit (2) in response to said control signal during the time slot in the transmission interval corresponding to a selected carrier frequency and during the reception interval during the occupied time slot.

4. A radio unit as claimed in claim 2, characterized in that the controllable local oscillator means comprises a single oscillator, which is conventionally controlled in response to said control signal with the aid of frequency synthesis for generating desired local oscillator frequencies, which comprise said carrier frequencies ($f_1$-$f_4$)

* * * * *